May 17, 1966  C. E. WINTER  3,251,441

CLUTCH

Filed April 2, 1964

INVENTOR
CARL E. WINTER
BY Elliott & Pastoriza
ATTORNEYS

United States Patent Office 3,251,441
Patented May 17, 1966

3,251,441
CLUTCH
Carl E. Winter, 10514 Kinnard Ave.,
Los Angeles, Calif.
Filed Apr. 2, 1964, Ser. No. 356,753
3 Claims. (Cl. 192—18)

This invention generally relates to electrically actuated clutch and brake mechanisms, and more particularly concerns an improved clutch apparatus which is electromagnetically actuated to cause frictional engagement between two surfaces and effect coupled rotation between an input and output shaft.

The usual conventional clutch operates on the principle of causing one friction surface to engage another friction surface such that movement of one clutch member is imparted to another clutching member. The primary problem associated with engaging clutching members, however, is the limitation upon driving torque in relationship to the load. In other words, oftentimes, the load to be driven may exceed the frictional force capable of being achieved between the two clutching members with the result that undesired slippage may occur.

Another problem experienced with clutch mechanisms is providing clutch apparatus which inherently embodies a quick engaging and disengaging characteristic. Of course, involved with this latter problem is the requirement of providing a means of imparting the clutching motion which will not cause a sudden shock or strain to the parts being connected that might effect their deterioration or damage.

With the foregoing in mind, it is an object of the present invention to provide an improved clutch apparatus wherein the clutching members are caused to engage each other with a friction force which increases in a manner proportionate to the load such that if the load is higher than normal, the frictional engaging force will be greater than normal and vice versa.

Another object of the present invention is to provide an improved clutching apparatus conforming with the aforegoing object, and yet a clutching apparatus in which controlled slippage may be achieved when a predetermined load is reached, or in other words embodying structure enabling slippage to occur at a given point thereby eliminating the possibility of overloading the apparatus.

Still a further object of the present invention is to provide a clutching apparatus in which the initial frictional engagement between the clutching members is attained quickly and positively, and in which subsequent interengagement between the clutching members is proportional to the driving torque required to impart motion to the shaft connected to the load.

A still further object of the present invention is to provide an improved clutching apparatus in which the clutching members are actuated in a manner so as to substantially avoid imparting any appreciable shock loads to the apparatus.

Finally an object of the present invention is to provide an improved clutching apparatus which is adaptable to braking applications and free-wheeling applications as well as for clutching purposes.

These and other objects and advantages of the present invention are generally achieved by providing an improved clutch apparatus which includes a housing having an input shaft at one end and an output shaft at the other end. Interposed between the input shaft and the output shaft is an axially movable shaft having coupled thereto first clutch means designed to engage a second clutch member or means on the input shaft. The axially movable shaft is coupled for rotation with the output shaft, although designed for limited axial movement with respect thereto.

Electro-magnetic means are provided within the housing and are designed to effect movement of the movable shaft to a position such that its clutching means engages the clutching member on the input shaft to thereby drive the output shaft which may be connected to the load. Towards this end, it is preferred that an armature be coupled to the movable shaft and designed to cause the aforesaid movement of the movable shaft in response to energization of the electro-magnetic means.

In a preferred embodiment, braking means are also provided in the housing for engagement by the clutch means on the movable shaft when the movable shaft returns to its original position. In this regard, spring means are additionally provided for returning the movable shaft to its original position upon de-energization of the electro-magnetic means.

A better understanding of the present invention will be had by reference to the drawings, showing merely illustrative embodiments thereof, and in which.

Figure 1:
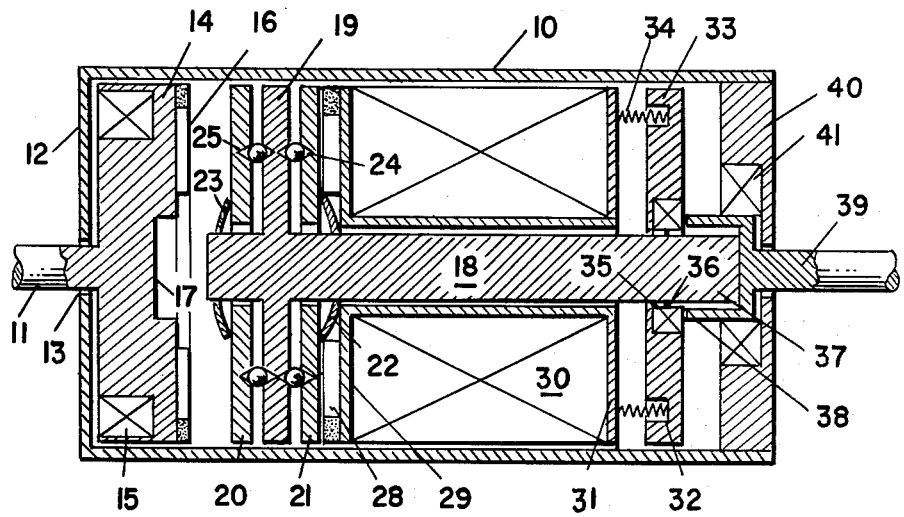
FIGURE 1 is a sectional view, partially schematic, showing the improved clutch apparatus of the present invention.

Referring now to the drawings, there is shown in FIGURE 1 an improved clutch apparatus including a housing 10 through which extends an input shaft 11 which may be suitably coupled to a source of power not shown. The housing 10 is provided with an end plate 12 having an opening 13 therein to accommodate the input shaft 11. The shaft 11 has formed on the inner end thereof a clutch member 14 journaled on a thrust-bearing 15. The thrust bearing 15 is employed in order to accommodate any axial load that may be imparted to the clutch member 14.

The clutch member 14 is provided with a conventional frictional surface 16 and a stepped center recess 17 to accommodate the adjacent end of a movable shaft 18 when the latter is moved towards the left (as viewed in FIGURE 1) during clutching actuation.

The movable shaft 18 has integrally formed as a part thereof a disc member 19 which is coupled to floating discs 20 and 21 on either side thereof. The discs 20 and 21 are biased towards the interposed shaft disc 19 by Belleville type springs or washers 22 and 23 disposed about the shaft 18.

Figure 3:
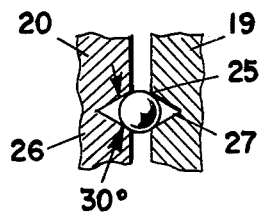
FIGURE 3 is an enlarged sectional view of the wedging means embodied in the clutch means coupled to the movable shaft of FIGURES 1 and 2.

In accordance with a feature of the present invention, a plurality of balls 24 and 25 are interposed, respectively, between the disc 19 and floating disc 20, and between the disc 19 and the floating disc 21. As seen more clearly in the view of FIGURE 3, each of the balls 25, for example, is partially retained in opposing conically shaped recesses or pits 26 and 27 provided respectively in the floating disc 20 and the integral shaft disc 19. Preferably the angle subtended by the pit 26 for example, is approximately 30 degrees. The pit 27 is similarly shaped, and of course, the balls 24 would be mounted in a similar manner in opposing pits provided in the disc 19 and floating disc 21. The function of the balls 24 and 25 will become clearer as the specification proceeds.

The floating disc 21 is designed for frictional engagement with a friction surface 28 provided on a coil housing 29 containing a coil 30. The housing 29 includes an end plate 31 towards which an armature 32 may move upon energization of the coil 30. Thus, the armature 32 is provided with a plurality of spaced recesses 33 receiving springs 34 which tend to keep the armature 32 in the position shown in FIGURE 1. Upon energization of the coil 30, the armature 32 is attracted towards the coil or to the left as viewed in FIGURE 1. The armature 32 is coupled to a bearing 35, which in turn is keyed through a snap ring 36 or the like, to the shaft 18.

The shaft 18 includes a splined end portion 37 which engages an internally splined collar 38 forming an integral part of an output shaft 39 connected to a load. The collar 38 is supported within an end plate 40 having a bearing 41 therein within which the collar is journaled.

The operation of the improved clutch apparatus, according to the present invention, may now be described. In conventional operation, the output shaft 39 is connected to a load, and the input shaft 11 (as heretofore stated) is connected to some type of driving means or power source. Normally, the spring members 34 bias the armature 32 towards a position substantially as shown in FIGURE 1; in consequence, the bearing 35 keyed to the shaft 18 would urge the shaft 18 and the coupled discs 19, 20, 21, towards the right hand side of the apparatus, as viewed in FIGURE 1 such that the friction surface 28 would engage the disc 21 to brake movement of the output or loaded shaft 39.

Upon energization of the coil 30, the electro-magnetic force would attract and draw the armature 32 towards the left overcoming the biasing force of springs 34. In consequence, the armature would force the bearing and coupled shaft 18 towards the left until the floating disc 20 came into engagement with the frictional surface 16. As this action occurred, the input shaft 11 would then begin driving the floating shaft 18 and the coupled output shaft 39.

In this regard, it is to be noted that the shaft 18 (as heretofore stated) has a splined connection to the interior of the collar 38 such that limited axial motion of the shaft 18 is possible while still remaining rotatively coupled to the shaft 39. On the other hand, the bearing 35 permits relative rotation of the shaft 18 with respect to the armature 32 while still maintaining an axially coupled relationship between the shaft 18 and the armature 32 such that axial movement of the armature effects axial movement of the shaft 18.

At the time the floating disc 20 engages the frictional surface 16, it will be appreciated that a rotative force will be imparted to the disc 20 which will tend to drive the disc 19 formed integrally with the shaft 18. However, since the shaft 18 is connected through the collar 38 to the loaded shaft 39, the disc 19 will resist rotative movement according to how much load is carried by the shaft 39. In consequence, because of the balls 25, the disc 20 will tend to wedge itself away from the disc 19 and thereby force itself more firmly in engagement with the frictional surface 16. Of course, if a point is reached such that the wedging force of the balls 25 plus the force of the springs 34 is greater than the electro-magnetic force holding the armature 32, then the armature 32 will be forced away from the coil housing 31. By pre-establishing the electro-magnetic force, this point may be ascertained in advance for slippage purposes or for preventing overload.

Assuming, however, that the electro-magnetic force is not exceeded, the balls 25 will wedge the disc 20 into tighter frictional engagement with the surafce 16 to maintain clutching action. With this type of an arrangement, the initial rotative torque imparted to the frictional surface 16 by the disc 20 will only be dependent upon the frictional engagement between these surfaces as a consequence of the electro-magnetic force overcoming the springs 34; in consequence, the shock load taken by the shaft 18 and output shaft 39 will upon clutching only be a function of such frictional force between the surface 16 and the disc 20. However, assuming that the shaft 39 is coupled to an appreciable load, the shaft 18 and disc 19 will have a resisting force which will tend to prevent rotation thereof despite the rotative torque imparted to the floating disc 20. As heretofore stated, this action will tend to create a wedging apart of the discs 19 and 20 with a gradual increase in the frictional force between the surface 16 and the disc 20 so that a corresponding gradual increase of clutching force will occur.

Upon de-energization of the coil 30, the spring means 34 will immediately act to force the armature 32 away from the coil end plate 31 towards the right (as viewed in FIGURE 1). In consequence, the armature 32 through the coupled bearing 35 and floating shaft 18 will draw back the disc member 20 from the frictional surface 16 to dis-engage these clutch members.

Assuming that a braking action is desired after disengaging the clutch members, the floating disc 21 thereafter engages the frictional surface 28 formed on the other side of the coil housing 29. This time, a reverse action will take place in that at first only the force of the springs 34 will cause the engagement between the two frictional surfaces; however, thereafter because the friction surface 28 is stationary and the disc 21 is still rotating because of its momentum, the disc 21 will be wedged away from the shaft disc 19 to cause the disc 21 to even more firmly engage the frictional surface 28. In consequence, the braking action will also be proportional to the load being braked.

It should be noted that despite the showing of the frictional surface 16 and the frictional surface 28 on only one of the opposing clutch faces, the frictional surfaces could be of any conventional type and applied to either or both of the opposing members 20–17 and 29–21.

In the event it is desired to have the clutching apparatus free-wheel after de-clutching, then the disc 21 and the frictional surface 28 may be eliminated since these parts have no other function except to brake when the shaft 18 returns to its normal position in FIGURE 1.

It will also be appreciated that the clutch apparatus of FIGURE 1 may be used in an alternate form in which the shaft 39 is a stationary member coupled to the floating shaft 18, and wherein the shaft 11 and clutch member 14 are connected to a driven member. For such a reversed condition, upon energization of the coil 30 and movement of the disc assembly to the left (as viewed in FIGURE 1), then the member 20 contacting the frictional surface 16 will cause a braking action to the shaft 11. Of course, such alternate form, the disc 21 and frictional surface 28 would not be employed as these parts would serve no function. Also, the shaft 39 and shaft 18 could be driven members and the shaft 11 and clutch member 17 a stationary member wherein the same type of braking action would occur upon energization of the coil 30, except the braking would apply to the shaft 18 and shaft 39.

It will thus be appreciated that the embodiment of the clutch apparatus of FIGURE 1 may be used in a variety of applications.

Figure 2:
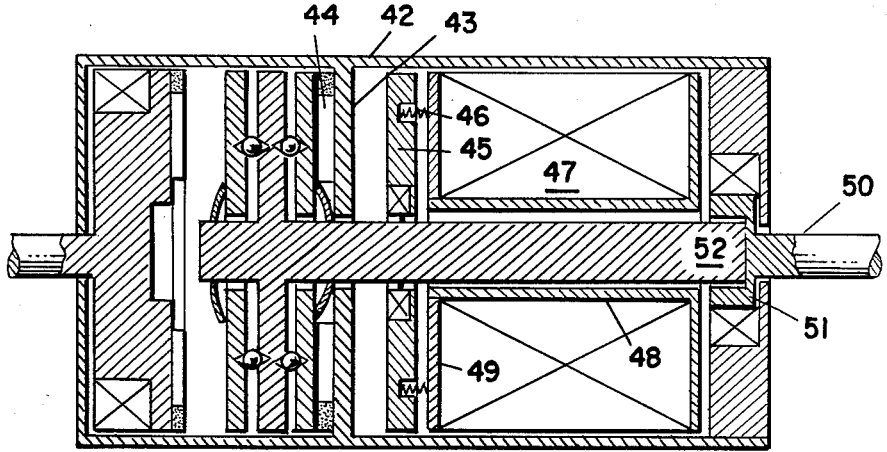
FIGURE 2 is a sectional view of a modified form of the invention of FIGURE 1.

In FIGURE 2 there is shown another embodiment of the invention of FIGURE 1 with certain of the parts reversed for an application primarily directed towards braking in response to coil energization and clutching as a consequence of de-energization of the coil.

Thus, except for different parts employed, the same numerals as used in FIGURE 1 will apply to the equivalent parts in FIGURE 2.

In FIGURE 2 there is shown a housing 42 which includes therein an inner partition 43 having on one side thereof a frictional surface 44. An armature 45 is provided which embodies spring means 46. A coil 47 is included which has a housing 48 and an end plate 49 co-functioning with the spring means 46.

An output shaft 50 is provided which is coupled through a collar 51 to a floating shaft 52.

With this construction it is seen that energization of the coil 47 will cause the shaft 52 and coupled disc assembly to move towards the right (as viewed in FIGURE 2) and thereby cause engagement between the disc assembly and the braking frictional surface 44. De-energization of the coil will allow the disc assembly to move towards the left and cause clutching action between the input and output shafts in the same manner as described in conjunction with FIGURE 1. Thus, exactly the reverse type of motion is achieved in response to energization or de-energization of the coil 30 in contrast to what occurs in FIGURE 1.

Similarly, and in reverse to the results obtained in FIGURE 1, the shaft 52 will free-wheel in response to energization of the coil assuming the frictional surface 44 and adjacent disc are removed; on the other hand, a clutching action will of course take place in the same manner upon deenergization of the coil 47.

Also, assuming that the input and output shafts are reversed, braking action will occur upon de-energization of the coil 47 (as shown in the position of FIGURE 2) and free-wheeling will occur upon energization of the coil 47 (assuming the friction surface 42 and adjacent disc are removed).

From the foregoing, it will be appreciated that many clutching, braking, and free-wheeling applications are embodied in the illustrative showings of FIGURES 1 and 2, and further, that many modifications and changes may be made without departing from the basic spirit and scope of the invention as described herein.

What is claimed is:

1. An improved clutch apparatus comprising: a housing; an input shaft extending through one end of said housing; an output shaft extending through the other end of said housing; a movable shaft rotatively coupled to one of said aforementioned shafts and axially movable with respect thereto between a first position and a second position, said movable shaft being interposed between said input shaft and said output shaft; first clutch means carried by said movable shaft; second clutch means carried by the other of said shafts not coupled to said movable shaft; electro-magnetic means mounted within said housing and designed upon energization to effect axial movement of said movable shaft to said second position, said electro-magnetic means being designed upon energization to bias said movable shaft in a direction towards said one of said shafts thereby maintaining disengagement of said first and second clutch means; and spring means carried by said electro-magnetic means and designed to bias said movable shaft against movement towards said second position.

2. The combination, according to claim 1, and wedging means embodied in said first clutch means, said wedging means comprising balls, and at least two adjacent members in said clutch means having said balls interposed therebetween, said balls tending to urge said members apart in response to relative rotation of one of said members with respect to the other of said members, said relative rotation being effected upon engagement of said respective clutch means.

3. The subject matter of claim 1, including a third clutch means retained within said housing for engaging said first clutch means in response to energization of said electro-magnetic means.

References Cited by the Examiner
UNITED STATES PATENTS

| | | |
|---|---|---|
| 2,354,854 | 8/1944 | Doll. |
| 2,464,129 | 3/1949 | Gottisheim. |
| 2,481,028 | 9/1949 | Lear. |
| 2,658,593 | 11/1953 | Doebeli. |
| 2,662,624 | 12/1953 | Giffin _____ 192—54 X |
| 2,947,394 | 8/1960 | Grover. |

DAVID J. WILLIAMOWSKY, *Primary Examiner.*

DON A. WAITE, *Examiner.*

B. W. WYCHE III, *Assistant Examiner.*